(12) United States Patent
Duval

(10) Patent No.: US 6,938,355 B1
(45) Date of Patent: Sep. 6, 2005

(54) ADHESIVE BEAD HEIGHT MEASURING SYSTEM

(75) Inventor: Antoine Pierre Duval, Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/888,048

(22) Filed: Jul. 9, 2004

(51) Int. Cl.⁷ ............................................... G01B 3/22

(52) U.S. Cl. ........................................ 33/832; 33/834

(58) Field of Search .................. 33/832–834, 531–532, 33/542, 613, 544.1

(56) References Cited

U.S. PATENT DOCUMENTS

| | | | | |
|---|---|---|---|---|
| 1,909,652 A | * | 5/1933 | Bower | 33/834 |
| 2,351,105 A | * | 6/1944 | Casali | 33/567 |
| 3,171,205 A | * | 3/1965 | Kurtz | 33/1 R |
| 4,062,121 A | * | 12/1977 | Fried et al. | 33/545 |
| 4,703,648 A | * | 11/1987 | Baresh | 73/104 |
| 5,134,785 A | * | 8/1992 | Gilpatrick | 33/832 |
| D411,808 S | * | 7/1999 | Irwin | D10/65 |
| 6,138,374 A | * | 10/2000 | Friedersdorf et al. | 33/834 |
| 6,336,275 B1 | * | 1/2002 | Shigyo | 33/567 |
| 6,792,691 B2 | * | 9/2004 | Genal et al. | 33/833 |

OTHER PUBLICATIONS

Loctite Technical Data Sheet Product 5910, Worldwide Version, Aug. 2002, 2 pages.
Mitutoyo America Corporation, HDS Digimatic Height Gages with Absolute Encoder, Series 570—with output for SPC, 1 page.

* cited by examiner

Primary Examiner—Christopher W. Fulton
Assistant Examiner—Yaritza Guadalupe

(57) ABSTRACT

An adhesive bead depth or height measuring system includes a base to which a bead of adhesive is applied by a production adhesive applying machine, and a slide gauge which slides over the base. The gauge member has a pair of rails which are separated by a slot, each rail having a bottom surface which slidably engages the base. The slot forms a planar ramp surface which extends in a longitudinal direction from a first end spaced apart from the bottom surfaces by a first larger distance to a second end spaced apart from the bottom surfaces by a second smaller distance. The gauge slides over the bead with the ramp surface facing the bead and with the first end of the ramp surface leading so that the bead engages and adheres to the ramp surface at a position between the first and second ends. This position is proportional to a height of the bead above a surface of the base. The base includes a guide slot which slidably receives and guides the gauge.

9 Claims, 2 Drawing Sheets

ADHESIVE BEAD HEIGHT MEASURING SYSTEM

BACKGROUND

The present invention relates to a gauge for measuring the height of a bead of adhesive used in the assembly of components.

Many components are assembled together with the use of adhesives or glues. Robotic machines are commercially available to apply controlled amounts of adhesive during assembly processes. Such machines inject or apply adhesive so that a layer or "bead" of adhesive is formed on an outer surface of the component or components to which the adhesive is applied. To achieve a proper assembly, it is often necessary to use a proper amount of adhesive, and to assure quality assemblies it is necessary to periodically measure the amount of applied adhesive to insure the correct operation of the adhesive applying machine. Various methods and tools have been used to measure the height of an adhesive bead on a part, such as machine vision systems and laser triangulation systems. But such systems are expensive and unreliable. Adhesive bead height has also been measured with a commercially available digital height gauge which has a measuring probe. However, with this type of gauge it is nearly impossible to measure the height of a soft wet bead of adhesive, because, when positioning the measuring probe, the probe may be above the bead or the probe may plunge into the bead, creating high measurement error.

A Technical Data Sheet for LOCTITE® adhesive Product 5910 describes a "PTFE block" which can be used to determine the depth of cure of an adhesive in a given amount of time. The block includes a channel which gradually increases in depth from 0 to 10 millimeters. The channel is filled with adhesive and allowed to cure for a certain time period, after which the adhesive is peeled away from the channel. The channel depth at the point where the adhesive remains is the cure depth for that particular cure time. However, because adhesive is applied to the tool and not applied by the production adhesive applying machine, and is not applied to a sample part, this tool cannot be used to determine whether an adhesive applying machine is set up properly to apply an adhesive bead with a proper height.

SUMMARY

Accordingly, an object of this invention is to provide an accurate and reliable tool for measuring the height of an adhesive bead applied to a test piece.

A further object of the invention is to provide such a bead height measuring tool which is inexpensive and simple to use.

These and other objects are achieved by the present invention, wherein an adhesive bead depth or height measuring system includes a slide base to which a bead of adhesive is applied by a production adhesive applying machine, and a slide gauge which slides over the base. The gauge has a pair of rails which are separated by a slot, each rail having a bottom surface which slidably engages the base. The slot forms a planar ramp surface which extends in a longitudinal direction from a first end spaced apart from the bottom surfaces by a first larger distance to a second end spaced apart from the bottom surfaces by a second smaller distance. The gauge slides over the bead with the ramp surface facing the bead and with the first end of the ramp surface leading so that the bead engages and adheres to the ramp surface at a position between the first and second ends. This position is proportional to a height of the bead above a surface of the base. The base includes a guide slot which slidably receives and guides the gauge.

DETAILED DESCRIPTION

Figure 1:
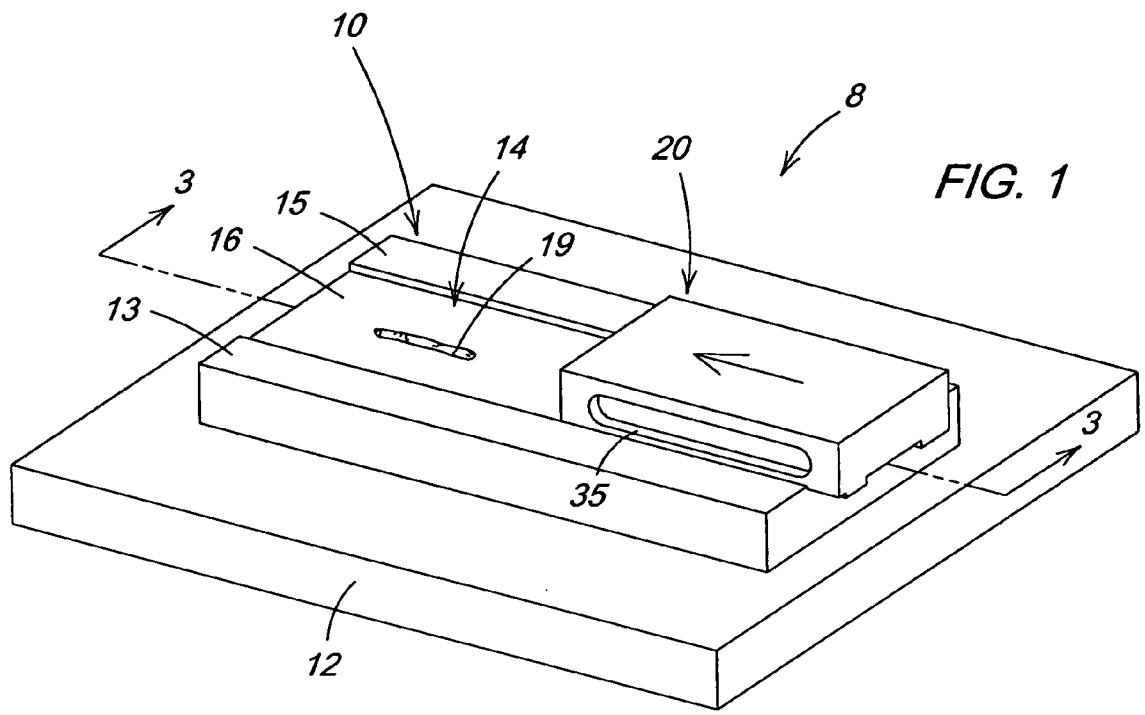
FIG. 1 is a perspective view of the adhesive bead measuring system according to the present invention.

Referring to FIG. 1, the bead height measuring system 8 includes a nylon base or slide base 10 and a slide gauge 20 which may be made out of aluminum. The base 10 is placed on a supporting table 12. Base 10 has a generally rectangular shape with a shallow slot 14 extending completely through one side thereof between rails 13 and 15. The slot 14 has a planar floor surface 16. A strip or bead 19 of adhesive is applied by a conventional adhesive applying machine (not shown) on or near the center of floor surface 16.

Figure 2:
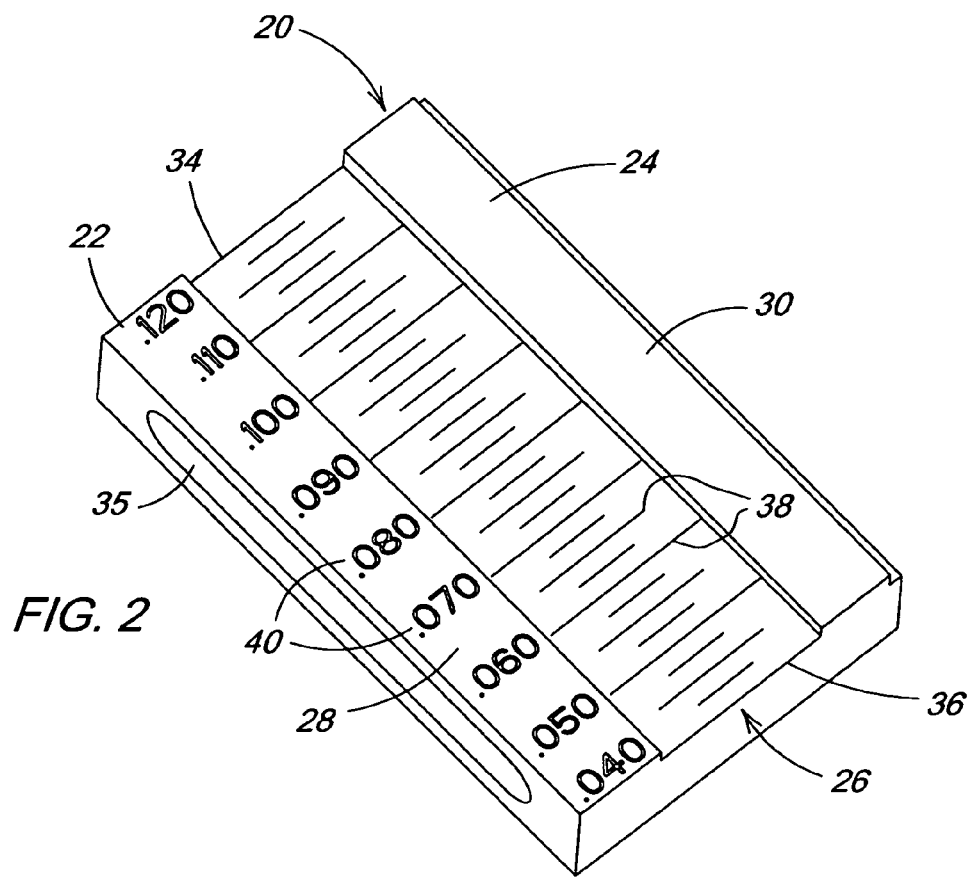
FIG. 2 is a perspective view of the slide gauge of FIG. 1.

The generally rectangular slide gauge 20 is placed in the slot 14 against the floor surface 16. As best seen in FIG. 2, the slide gauge 20 includes a pair of rails 22, 24 which are separated by a slot 26. Each rail 22, 24 has a bottom surface 28, 30 which slidably engages the floor 16. The slot 26 forms a planar ramp surface 32. The ramp surface 32 extending in a longitudinal direction from a first end 34 spaced apart from the bottom surfaces by a first larger distance D1 to a second end 36 spaced apart from the bottom surfaces by a second smaller distance D2. As a result, the ramp surface 32 is tilted with respect to the base or floor surface 16.

Preferably, a plurality of regularly spaced marks 38 are distributed over the ramp surface 32, each mark extending perpendicularly with respect to the laterally outer edges of the rails 22, 24. Also, depth numbers 40 are placed on the slide gauge 20 in association with at least some of the marks, so that the depth numbers represent the depth of the slot 26 at the mark associated with that depth number, with respect to a plane surface which contains the bottom surfaces 28, 30 of rails 22, 24. Shallow recesses 35 are formed in both sides of guide 20 (one side being visible in FIG. 1) to prevent the guide 20 from slipping out of a user's hand while it is being manipulated. The recesses may be a little over ¼ inch deep and therefore do not extend through the guide 20.

Figure 3:
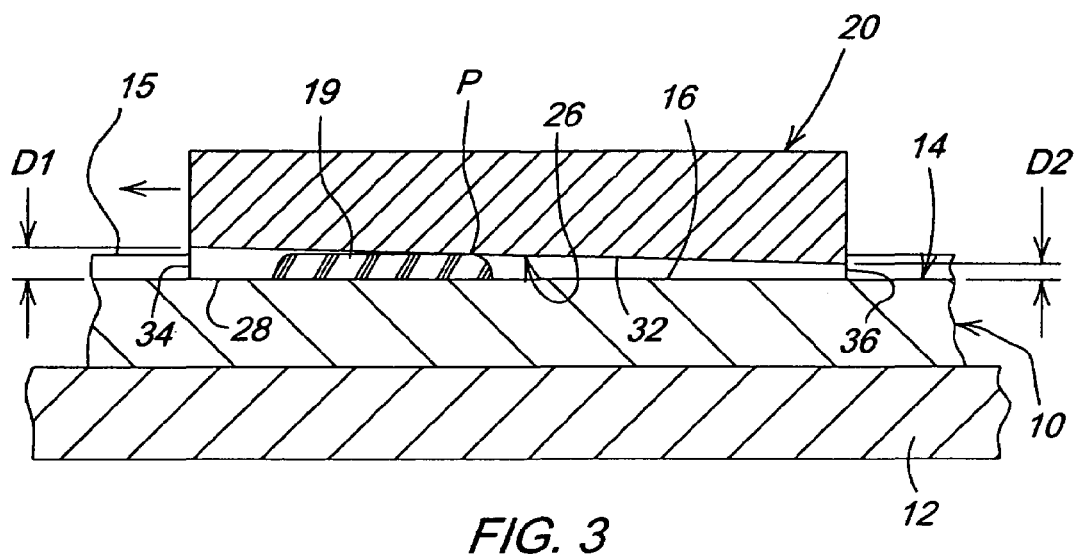
FIG. 3 is a sectional view of the system of FIG. 1 as the slide gauge comes into contact with an adhesive bead.

Referring now to FIGS. 2 and 3, before the bead 19 has cured, the slide gauge 20 is place against slot floor 16 of slide base 10 with the first end of slot 26 oriented towards the adhesive bead 19. The slide gauge 20 is then moved towards and completely over bead 19 while rails 22, 24 remain in sliding contact with slot surface 16. As best seen in FIG. 3, at some position an end portion of the bead 19 will contact and adhere to the ramp surface 32 at point P.

Figure 4:
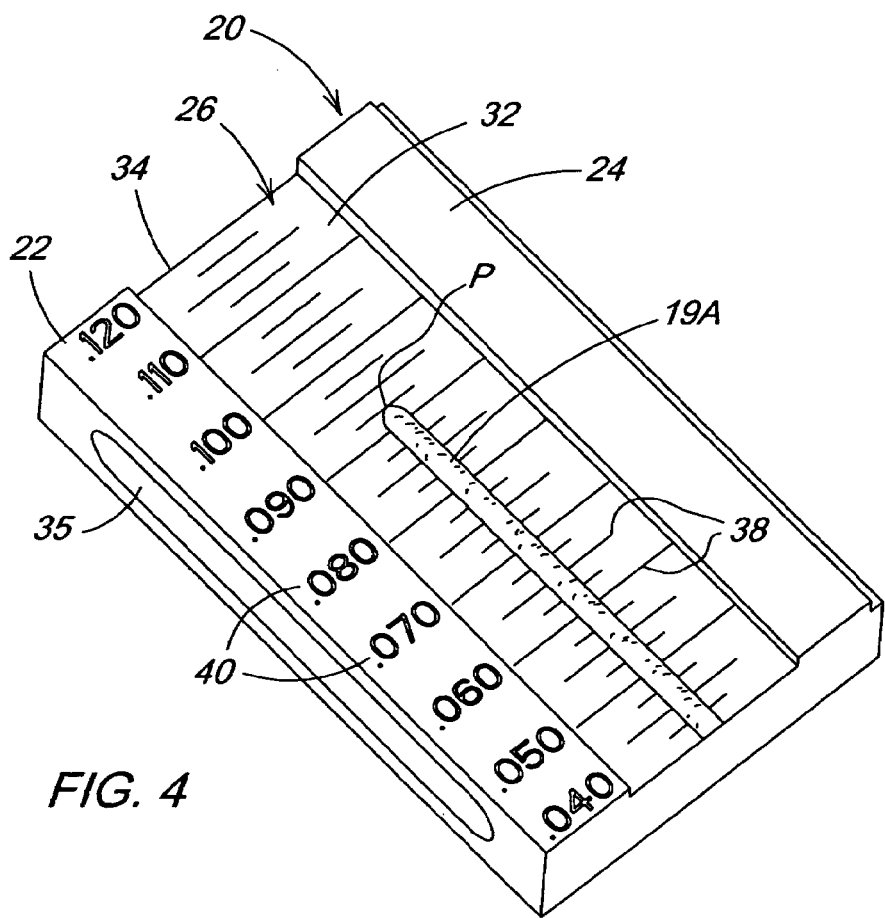
FIG. 4 is a view of the slide gauge after it has been slid over a test adhesive bead.

After the slide gauge 20 is moved completely over bead 19, the slide gauge 20 is pulled away from slide base 10 so that the surface 32 of slot 26 can be examined. As best seen in FIG. 4, at least a portion of the bead 19A will have adhered to the slot surface 32. The mark 38 and the associated number 40 nearest to the end of the bead 19A oriented towards first end 34 of slot 26 represents the height of bead 19. If the measured height is not what is desired, then the adhesive applying machine (not shown) can be adjusted until it produces a bead with the desired height. Both the base 10 and the slide gage 20 may be easily cleaned with an alcohol towelette.

This bead height measuring system 8 does not require repetitive set-up, programming, and calibration. Initial tooling costs are low and a small fraction of the cost of a vision system. Compared to lasers or vision system, the system 8 is not sensitive to the effects of light, vibration or power glitches. The slide gage 20 and base 10 are rugged, simple and easy to use. The system 8 does not require specialized or advanced training.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. An adhesive bead measuring tool comprising:
a base member to which adhesive is applied so as to form a bead projecting from a base surface of the base member; and
a gauge member which slidably engages the base member and which is movable over the bead, the gauge member having a ramp surface which is tilted with respect to the base surface and faces the base surface when the gauge member is slidably engaging the base member, the gauge member sliding over the bead so that the bead engages and adheres to the ramp surface at a position thereon, said position being indicative of a height of the bead above the base surface.

2. The adhesive bead measuring tool of claim 1, wherein:
the gauge member includes a plurality of bead height numbers, each associated with a different position along the ramp surface.

3. The adhesive bead measuring tool of claim 2, wherein:
a plurality of uniformly spaced hash marks are formed on the ramp surface.

4. The adhesive bead measuring tool of claim 1, wherein:
the ramp surface extends in a longitudinal direction from a first end spaced apart from base member by a first larger distance to a second end spaced apart from the base member by a second smaller distance, the gauge member sliding over the bead with the ramp surface facing the bead and with the first end of the ramp surface leading.

5. The adhesive bead measuring tool of claim 4, wherein:
a plurality of uniformly spaced hash marks are formed on the ramp surface; and each hash mark extends at least partially across the ramp surface and perpendicular to the longitudinal direction.

6. The adhesive bead measuring tool of claim 1, wherein:
the base member includes a guide slot which receives and guides the gauge member.

7. The adhesive bead measuring tool of claim 1, wherein:
the gauge member having a pair of rails which are separated by a slot, each rail having a bottom surface which slidably engage the part, the slot forming the planar ramp surface.

8. An adhesive bead measuring tool comprising:
a base member to which adhesive is applied so as to form a bead projecting from a surface of the base member, the base member including a guide slot extending therein; and
a gauge member which slidably engages the base member, is received by the guide slot and which is movable over the bead, the gauge member having a pair of rails which are separated by a slot, each rail having a bottom surface which slidably engage the part, the slot forming a planar ramp surface, the ramp surface extending in a longitudinal direction from a first end spaced apart from the bottom surfaces by a first larger distance to a second end spaced apart from the bottom surfaces by a second smaller distance, the gauge member sliding over the bead with the ramp surface facing the bead and with the first end of the ramp surface leading so that the bead engages and adheres to the ramp surface at a position between the first and second ends, said position being proportional to a height of the bead above a surface of the base member.

9. An adhesive bead measuring tool comprising:
a base member to which adhesive is applied so as to form a bead projecting from a base surface of the base member; and
a gauge member which slidably engages the base member and which is movable over the bead, the gauge member having a planar ramp surface, the ramp surface extending in a longitudinal direction from a first end spaced apart from base member by a first larger distance to a second end spaced apart from the base member by a second smaller distance, the gauge member sliding over the bead with the ramp surface facing the bead and with the first end of the ramp surface leading so that the bead engages and adheres to the ramp surface at a position between the first and second ends, said position being proportional to a height of the bead above the base surface.

* * * * *